R. R. WILKINSON.
Egg-Carrier.
No. 204,934. Patented June 18, 1878.
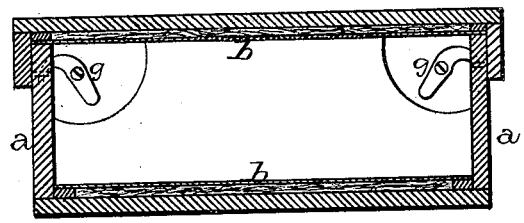
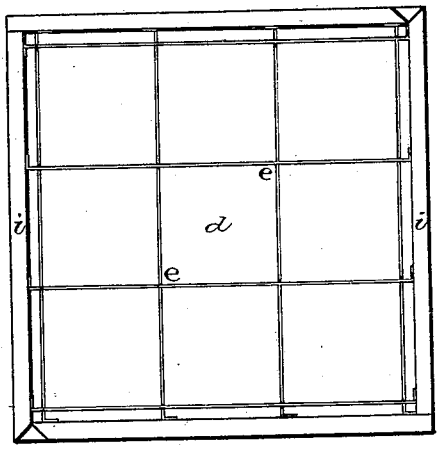
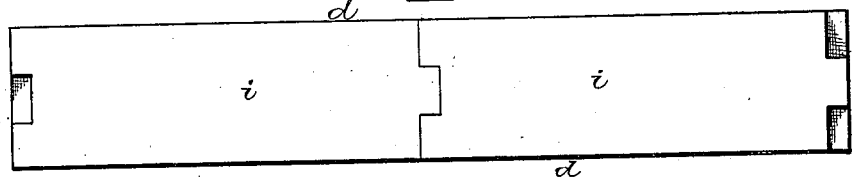
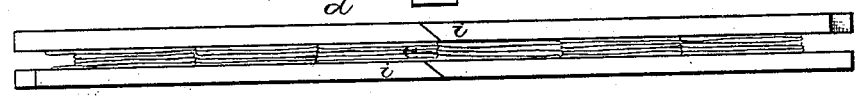
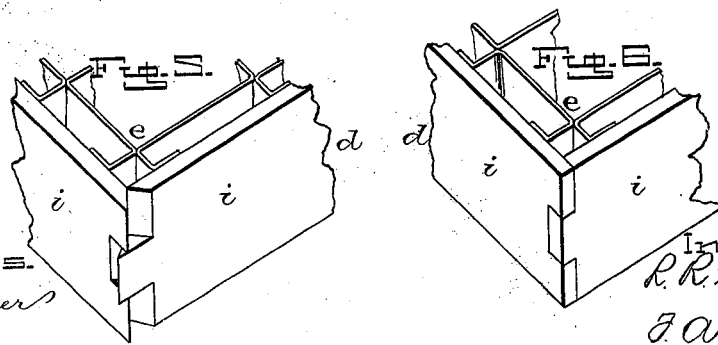
Witnesses.
Inventor.
R. R. Wilkinson,
per
J. A. Lehmann,
Atty.

UNITED STATES PATENT OFFICE.

ROBERT R. WILKINSON, OF JAMESTOWN, MICHIGAN.

IMPROVEMENT IN EGG-CARRIERS.

Specification forming part of Letters Patent No. 204,934, dated June 18, 1878; application filed May 16, 1878.

*To all whom it may concern:*

Be it known that I, ROBERT R. WILKINSON, of Jamestown, in the county of Ottawa and State of Michigan, have invented certain new and useful Improvements in Egg-Carriers; and I do hereby declare the following to be a full, clear, and exact description of the invention, such as will enable others skilled in the art to which it pertains to make and use it, reference being had to the accompanying drawings, which form part of this specification.

My invention relates to an improvement in egg-carriers; and it consists in the combination of wooden side and end pieces and fibrous strips to form the partitions, the ends of the wooden pieces being so formed as to fold together, as will be more fully described hereinafter.

The accompanying drawings represent my invention.

$a$ represents the box in which the sections containing the eggs are to be packed, and this box is hinged together at the ends and otherwise constructed as shown in my Patent No. 199,339, granted January 15, 1878, so that the box, after it has been emptied of the eggs, can be folded up into a very small space, and thus decrease the cost of freight in sending it back to the shipper. The hinged portions of the box are fastened together by means of the hooks or catches $g$, which are pivoted near their centers, so that the outer end will form a lever for operating them. By thus forming a lever on the ends of the hooks, the hooks can be much more readily managed and are more easily disengaged in case they should become stuck. The top and the bottom of this box $a$ are provided with the padding $b$, against which the eggs bear, so that there will not be the slightest danger of the eggs being broken by any rough handling they may receive in transportation. This padding may be secured directly to the bottom of the box, or may be raised a slight distance above it, as here shown, so as to make it as elastic as possible.

Each one of the sections $d$ are composed of the usual side and end pieces or strips $i$ of wood, and the projections for the eggs are formed by means of the strips of fibrous material $e$. These strips $e$ have their ends tacked or otherwise secured to the wooden pieces $i$, and act as pivots in joining the strips together. Each one of the pieces, at its end, is provided with a tongue or recess, and one of the ends of each one of the pieces is beveled, as shown, while the opposite is made perfectly square. The square ends act as stops in opening the sections outward, so as to prevent the strips from moving past a right angle with each other, while the beveled ends serve to allow the strips, when the section is closed inward, to be forced into a straight line with each other. These pieces $i$ are not pivoted together by means of pins, but are fastened together entirely by means of the strips of fibrous material $e$, which form the compartments for the eggs, as shown, one end of one strip being fastened on one side of one corner, and one end of the other strip being fastened on the other side. By thus uniting the four pieces flexibly together, it will readily be seen that each section can be folded up so as to occupy but little more space than the thickness of the wood alone, thus enabling a large number of sections to be packed into comparatively little space.

Having thus described my invention, I claim—

1. In an egg-carrier, the combination of wooden end and side pieces and strips of fibrous material, the wooden pieces having their ends made to interlock, and being secured together by the fibrous strips at the corners, substantially as shown.

2. In an egg-carrier, the combination of the side and end pieces $i$ and the strips of fibrous material $e$, the pieces $i$ being held together by means of the pieces $e$, so that the section can be folded together into a very small space, substantially as specified.

In testimony that I claim the foregoing I have hereunto set my hand this 7th day of May, 1878.

ROBERT R. WILKINSON.

Witnesses:
JOHN B. WILES,
S. H. HOOD.